(12) United States Patent
Catton et al.

(10) Patent No.: US 12,035,114 B2
(45) Date of Patent: Jul. 9, 2024

(54) APPARATUS, METHOD AND COMPUTER PROGRAM FOR ANALYZING AUDIO ENVIRONMENTS

(71) Applicant: Nokia Technologies Oy, Espoo (FI)

(72) Inventors: Phil Catton, Cambridge (GB); Christopher Wright, London (GB); Wai Lau, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/397,164

(22) Filed: Aug. 9, 2021

(65) Prior Publication Data
US 2022/0060823 A1    Feb. 24, 2022

(30) Foreign Application Priority Data
Aug. 24, 2020 (EP) .................................. 20192365.3

(51) Int. Cl.
| | |
|---|---|
| *H04R 3/00* | (2006.01) |
| *G01S 5/20* | (2006.01) |
| *G10K 11/178* | (2006.01) |
| *H04R 1/40* | (2006.01) |

(52) U.S. Cl.
CPC ................ *H04R 3/005* (2013.01); *G01S 5/20* (2013.01); *G10K 11/17823* (2018.01); *H04R 1/406* (2013.01); *G10K 2210/3044* (2013.01); *H04R 2430/20* (2013.01)

(58) Field of Classification Search
CPC .... H04R 3/005; H04R 1/406; H04R 2430/20; G10K 11/17823; G10K 2210/3044; G01S 5/20

USPC .............................................. 381/56, 58, 91
See application file for complete search history.

(56) References Cited

U.S. PATENT DOCUMENTS

| | | |
|---|---|---|
| 5,122,805 A | 6/1992 | Peterman et al. |
| 9,430,931 B1 * | 8/2016 | Liu .................... G08B 21/24 |
| 2003/0059078 A1 | 3/2003 | Downs, Jr. et al. |

(Continued)

FOREIGN PATENT DOCUMENTS

| | | |
|---|---|---|
| CN | 110673125 A | 1/2020 |
| EP | 2063287 A1 | 5/2009 |
| WO | 2006/075263 A1 | 7/2006 |

OTHER PUBLICATIONS

Xu et al., "WaveEar: Exploring a mmWave-based Noise-resistant Speech Sensing for Voice-User Interface", Proceedings of the 17th Annual International Conference on Mobile Systems, Applications, and Services, Jun. 2019, pp. 14-26.

(Continued)

*Primary Examiner* — William A Jerez Lora
(74) *Attorney, Agent, or Firm* — SQUIRE PATTON BOGGS (US) LLP (57) ABSTRACT

Examples of the disclosure relate to an apparatus comprising means for: using a radiofrequency beam having a wavelength below approximately 10 mm to interrogate one or more acoustic reporters in an audio environment; analysing one or more sound signals reported by the one or more acoustic reporters to determine positions of one or more sound sources providing the one or more sound signals; and using the positions of the one or more sound sources to determine one or more sound propagation paths within the audio environment.

19 Claims, 5 Drawing Sheets

(56) References Cited

U.S. PATENT DOCUMENTS

| | | | | |
|---|---|---|---|---|
| 2011/0082690 | A1* | 4/2011 | Togami | H04R 29/005 |
| | | | | 704/201 |
| 2012/0069242 | A1* | 3/2012 | Pearlstein | G10K 11/17827 |
| | | | | 348/484 |
| 2015/0293647 | A1* | 10/2015 | Katabi | G01S 5/0036 |
| | | | | 345/173 |
| 2019/0387344 | A1* | 12/2019 | Kim | H04R 5/04 |
| 2020/0077221 | A1 | 3/2020 | Tammam | |
| 2020/0154183 | A1 | 5/2020 | Chua et al. | |
| 2021/0335335 | A1* | 10/2021 | Erad | G10H 1/0025 |

OTHER PUBLICATIONS

Ikram et al., "High-accuracy Distance Measurement using Millimeter-Wave Radar", IEEE Radar Conference (RadarConf18), Apr. 23-27, 2018, pp. 1296-1300.

"MIT Researchers used Wi-Fi to Recognize People through Walls", The Verge, Retrieved on Jul. 27, 2021, Webpage available at : https://www.theverge.com/2015/10/28/9625636/rf-capture-mit-wifi-tracking-surveillance-technology.

Hou et al., "Effects of Atmospheric Moisture on the Radiation Intensity of Objects in Millimeter-wave Band", Infrared Physics & Technology, vol. 103, Dec. 2019, pp. 1-12.

"Working from Home is the Future", LinkedIn, Retrieved on Jul. 27, 2021, Webpage available at : https://www.linkedin.com/feed/news/working-from-home-is-the-future-5097042/.

"Work From Home is Here to Stay", The Atlantic, Retrieved on Jul. 27, 2021, Webpage available at : https://www.theatlantic.com/health/archive/2020/05/work-from-home-pandemic/611098/.

"How Hearables will Drive the Attention Economy", Computer World, Retrieved on Jul. 27, 2021, Webpage available at : https://www.computerworld.com/article/3409138/how-hearables-will-drive-the-attention-economy.html.

"Why Noise Cancelling Headphones Don't Block Voices and What You Can Do About it", NoisyWorld, Retrieved on Jul. 27, 2021, Webpage available at : https://noisyworld.org/noise-cancelling-headphones-voices/.

"Can Noise-Cancelling Headphones Block Out Voices?", Audio MAV, Retrieved on Jul. 29, 2021, Webpage available at : https://audiomav.com/can-noise-cancelling-headphones-block-out-voices/.

Shen et al., "MUTE: Bringing IoT to Noise Cancellation", Proceedings of the 2018 Conference of the ACM Special Interest Group on Data Communication, Aug. 2018, 15 pages.

Chen et al., "Noise Suppression in 94 Ghz Radar-detected Speech Based on Perceptual Wavelet Packet", Entropy, vol. 18, No. 7, Jul. 19, 2016, pp. 1-14.

Li et al., "The Enhancement of Millimeter Wave Conduct Speech Based on Perceptual Weighting", Progress in Electromagnetics Research B, vol. 9, 2008, pp. 199-214.

Extended European Search Report received for corresponding European Patent Application No. 20192365.3, dated Feb. 23, 2021, 6 pages.

* cited by examiner

APPARATUS, METHOD AND COMPUTER PROGRAM FOR ANALYZING AUDIO ENVIRONMENTS

TECHNOLOGICAL FIELD

Examples of the disclosure relate to apparatus, methods and computer programs for analysing audio environments. Some relate to apparatus, methods and computer programs for analysing audio environments to determine one or more sound propagation paths within the audio environment.

BACKGROUND

There can be many circumstances in which it is useful to have information about audio environments. For example, if a user wants noise cancellation or if the detection of a particular sound within the audio environment is important.

BRIEF SUMMARY

According to various, but not necessarily all, examples of the disclosure there is provided an apparatus comprising means for: using a radiofrequency beam having a wavelength below approximately 10 mm to interrogate one or more acoustic reporters in an audio environment; analysing one or more sound signals reported by the one or more acoustic reporters to determine positions of one or more sound sources providing the one or more sound signals; and using the positions of the one or more sound sources to determine one or more sound propagation paths within the audio environment.

The means may be for enabling a sweep of the radio frequency beam to determine the positions of one or more acoustic reporters.

The positions of one or more acoustic reporters may be used, with the positions of the one or more sound sources, to determine the one or more sound propagation paths within the audio environment.

The one or more sound propagation paths may comprise at least one sound propagation path from a sound source to a user within the audio environment.

At least one sound propagation path may comprise an indirect sound propagation path.

The means may be for using the one or more sound propagation paths and information about the one or more reported sound signals to estimate one or more anti-sound signals to be provided to a user within the audio environment.

The means may be for using the one or more sound propagation paths to enhance one or more sound signals to be provided to a user.

The one or more sound propagation paths may be determined by identifying how the same sound signal is reported by different acoustic reporters within the audio environment.

The means may be for using the determined position of one or more sound sources to configure the apparatus to monitor for sounds in the determined position.

The means may be for detecting one or more other apparatus within the audio environment and sharing information with the one or more other apparatus wherein the shared information relates to one or more of: positions of one or more sound sources, positions of one or more acoustic reporters, one or more sound propagation paths within the audio environment.

The means may be for determining which of the one or more apparatus within the audio environment should interrogate one or more of the acoustic reporters within the audio environment.

The apparatus that should interrogate one or more acoustic reporters within the audio environment may be determined based on one or more of: the position of the apparatus relative to one or more acoustic reporters, the activity level of the apparatus, reducing the number of apparatus being used to interrogate one or more acoustic reporters.

The means may be for prioritising interrogating the one or more acoustic reporters based on the frequency of the sound signals reported by the one or more acoustic reporters such that higher frequency signals have a higher priority than lower frequency signals.

The radiofrequency beam used to interrogate the acoustic reporters may comprise one or more data packets.

The means may be for providing information to a user relating to the positions of the one or more acoustic reporters.

The radiofrequency beam used to interrogate the acoustic reporters may comprise 5G signals.

According to various, but not necessarily all, examples of the disclosure there may be provided a method comprising: using a radiofrequency beam having a wavelength below approximately 10 mm to interrogate one or more acoustic reporters in an audio environment; analysing one or more sound signals reported by the one or more acoustic reporters to determine positions of one or more sound sources providing the one or more sound signals; and using the positions of the one or more sound sources to determine one or more sound propagation paths within the audio environment.

According to various, but not necessarily all, examples of the disclosure there is provided a computer program comprising computer program instructions that, when executed by processing circuitry cause; using a radiofrequency beam having a wavelength below approximately 10 mm to interrogate one or more acoustic reporters in an audio environment; analysing one or more sound signals reported by the one or more acoustic reporters to determine positions of one or more sound sources providing the one or more sound signals; and using the positions of the one or more sound sources to determine one or more sound propagation paths within the audio environment.

BRIEF DESCRIPTION

Some examples will now be described with reference to the accompanying drawings in which.

DETAILED DESCRIPTION

Examples of the disclosure relate to apparatus 101, methods and computer programs 109 that can be used to analyse audio environments 203. In some examples the analysis of the audio environments 203 could be used to provide noise cancellation for users within the audio environments 203. In some examples the analysis of the audio environments 203 could be used to monitor for events occurring within the audio environments 203 or for any other suitable purpose.

Figure 1:
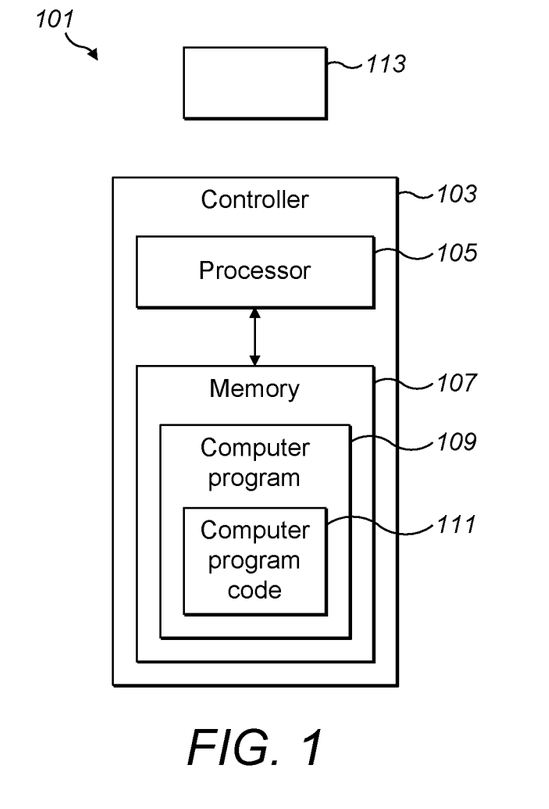
FIG. 1 shows an example apparatus.

FIG. 1 schematically illustrates an apparatus 101 according to examples of the disclosure. The apparatus 101 illustrated in FIG. 1 can be a chip or a chip-set. In some examples the apparatus 101 can be provided within electronic devices such as mobile phones, smart speakers or any other suitable devices that are configured to enable wireless communication.

In the example of FIG. 1 the apparatus 101 comprises a controller 103. In the example of FIG. 1 the implementation of the controller 103 can be as controller circuitry. In some examples the controller 103 can be implemented in hardware alone, have certain aspects in software including firmware alone or can be a combination of hardware and software (including firmware).

As illustrated in FIG. 1 the controller 103 can be implemented using instructions that enable hardware functionality, for example, by using executable instructions of a computer program 109 in a general-purpose or special-purpose processor 105 that can be stored on a computer readable storage medium (disk, memory etc.) to be executed by such a processor 105.

The processor 105 is configured to read from and write to the memory 107. The processor 105 can also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIGS. 4 and 5. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: using 401 a radiofrequency beam having a wavelength below approximately 10 mm to interrogate one or more acoustic reporters 303 in an audio environment 203; analysing 403 one or more sound signals reported by the one or more acoustic reporters 303 to determine positions of one or more sound sources 305 providing the one or more sound signals; and using 405 the positions of the one or more sound sources to determine one or more sound propagation paths within the audio environment 203.

As illustrated in FIG. 1 the computer program 109 can arrive at the apparatus 101 via any suitable delivery mechanism 113. The delivery mechanism 113 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism can be a signal configured to reliably transfer the computer program 109. The apparatus 101 can propagate or transmit the computer program 109 as a computer data signal. In some examples the computer program 109 can be transmitted to the apparatus 101 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: using 401 a radiofrequency beam having a wavelength below approximately 10 mm to interrogate one or more acoustic reporters 303 in an audio environment 203; analysing 403 one or more sound signals reported by the one or more acoustic reporters 303 to determine positions of one or more sound sources 305 providing the one or more sound signals; and using 405 the positions of the one or more sound sources to determine one or more sound propagation paths within the audio environment.

The computer program instructions can be comprised in a computer program 109, a non-transitory computer readable medium, a computer program product, a machine readable medium. In some but not necessarily all examples, the computer program instructions can be distributed over more than one computer program 109.

Although the memory 107 is illustrated as a single component/circuitry it can be implemented as one or more separate components/circuitry some or all of which can be integrated/removable and/or can provide permanent/semi-permanent/dynamic/cached storage.

Although the processor 105 is illustrated as a single component/circuitry it can be implemented as one or more separate components/circuitry some or all of which can be integrated/removable. The processor 105 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software can not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 4:
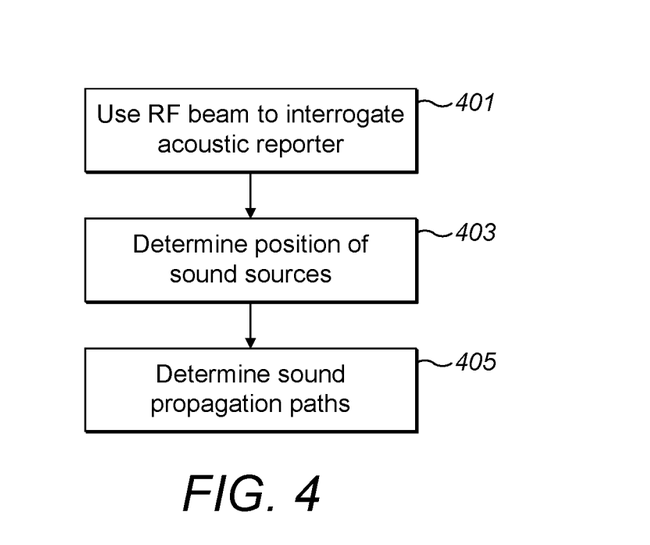
FIG. 4 shows an example method.
Figure 5:
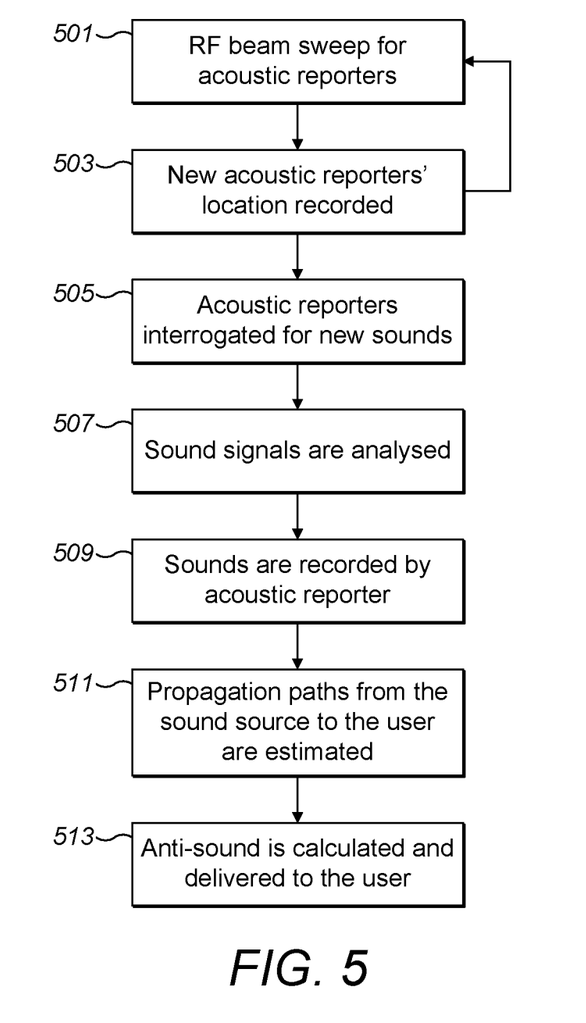
FIG. 5 shows another example method.

The blocks illustrated in FIGS. 4 and 5 can represent steps in a method and/or sections of code in the computer program 109. The illustration of a particular order to the blocks does not necessarily imply that there is a required or preferred order for the blocks and the order and arrangement of the blocks can be varied. Furthermore, it can be possible for some blocks to be omitted.

Figure 2:
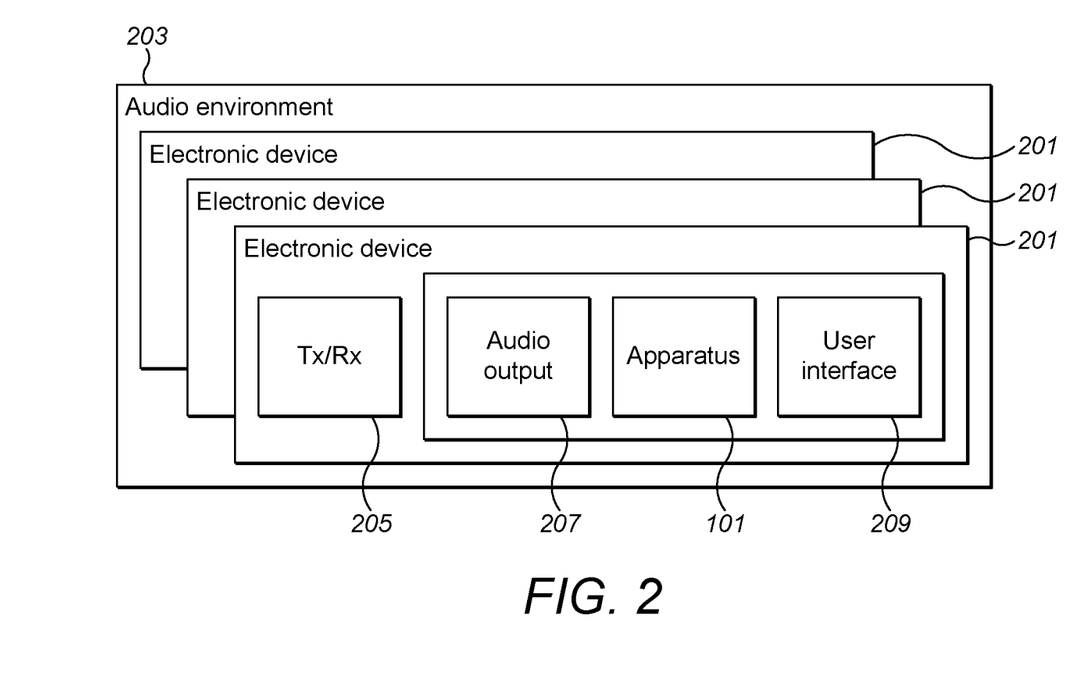
FIG. 2 shows example electronic devices.

FIG. 2 shows an example electronic device 201 that can be used to implement examples of the disclosure. The electronic device 201 could be a mobile phone, a smart speaker or any other suitable device that can be configured to enable wireless communication.

The electronic device 201 comprises an apparatus 101, a user interface 209, an audio output 207 and a transceiver 205. Only the components of the electronic device 201 referred to in the following description have been shown in FIG. 2. It is to be appreciated that in implementations of the disclosure the electronic device 201 can comprise additional components that have not been shown in FIG. 2. For example, the electronic device 201 can comprise a power source and other suitable components.

The apparatus 101 can be a controller 103 comprising a processor 105 and memory 107 that can be as shown in FIG. 1. The apparatus 101 can be configured to enable control of the electronic device 201. For example the apparatus 101 can be configured to control the radiofrequency beams that are transmitted by the transceiver 205.

In some examples the apparatus 101 can be configured to enable signal processing. In such examples, signals received by the transceiver 205 can be provided to the apparatus 101 to enable processing of the received signals. The apparatus 101 can be configured to process the signals to analyse the audio environment 203 in which the electronic device 201 is located. In some examples the apparatus 101 can be configured to enable the electronic device 201 to implement methods such as the methods shown in FIGS. 4 and 5.

The user interface 209 can comprise any means that enables a user to control the electronic device 201. The user interface 209 can comprise a user output device and a user input device.

The user output device can comprise any means that can be configured to provide an output to a user of the electronic device 201. In some examples the user output device can comprise a display or other output means that can enable visual outputs to be provided to the user.

The user input device can comprise any means that can be configured to enable a user of the electronic device 201 to make inputs into the electronic device 201. In some examples the electronic device 201 can comprise a touch sensitive display or any other suitable user input means. The user input device can be configured to enable a user to select menu options or to make any other suitable type of user input.

This can enable a user to control one or more functions of the electronic device 201.

The user interface 209 is configured to receive inputs from the apparatus 101 and to provide outputs to the apparatus 101. This can enable the controller 103 of the apparatus 101 to control the outputs provided by the user output device. This can also enable user inputs from the user input device to be used to control the functions performed by the controller 103.

The audio output device 207 can comprise any means that can be configured to provide an audio output. The audio output device 207 is configured to convert an electrical input signal to an output sound signal. The audio output device 207 can comprise one or more loudspeakers, earphones, a head set or any other suitable type of device.

In the example of FIG. 2 the audio output device 207 is part of the electronic device 201. In other examples one or more audio output devices 207 could be provided as peripheral devices to the electronic device 201. For example, a loudspeaker could be connected to an electronic device 201 such as a mobile phone.

The transceiver 205 can be configured to enable wireless communications. The transceiver 205 can comprise any means that can be configured to enable radio frequency signals to be transmitted and received by the electronic device 201.

The transceiver 205 can be configured to enable wireless communication using mm waves. The transceiver 205 can be configured to enable wireless communication using a wavelength below approximately 10 mm. Wavelengths below approximately 10 mm can be considered to be short wavelengths. The transceiver 205 can be configured to enable wireless communication using a high frequency. The high frequency can be above 24 GHz. In some examples the frequency may be between 24 to 39 GHz.

The transceiver 205 can be configured to enable 5G communication. The transceiver 205 can be configured to enable communication within New Radio networks. New Radio is the 3GPP ($3^{rd}$ Generation Partnership Project) name for 5G technology.

The transceiver 205 can be configured to enable beam forming so that one or more radiofrequency beams can be provided by the transceiver 205. The transceiver 205 can comprise a plurality of antenna elements to enable the radiofrequency beams to be provided.

The transceiver 205 can be configured to enable sweeping of the radiofrequency beam. That is, the transceiver 205 can be configured to enable the radiofrequency beam to be directed in a plurality of different angles. In some examples the radiofrequency beams can be directed in a plurality of different angles at the same time. For instance digital beam-forming can enable a plurality of different radiofrequency beams to be provided in different directions at the same time. In other examples the radiofrequency beams can be directed in different directions at different times.

In the example shown in FIG. 2 a plurality of electronic devices 201 are provided within the audio environment 203. The plurality of electronic devices 201 can be configured to wirelessly communicate with each other. The plurality of electronic devices 201 can be configured to communicate with each other using a 5G network or any other suitable means.

In the example shown in FIG. 2 each of the electronic devices 201 are the same in that they each comprise an apparatus 101, a user interface 209, an audio output 207 and a transceiver 205. In other examples different types of electronic devices 201 that comprise different components could be provided.

The plurality of electronic devices 201 are all provided within the same audio environment 203. The audio environment can comprise any environment that comprises one or more sound signals. The audio environment 203 could comprise a room, a section of a room or any other suitable environment.

The sound signals within the audio environment 203 can be provided by one or more sound sources. In some examples the sound sources could be provided within the audio environment 203. In other examples the sound sources could be provided outside of the audio environment 203 but could enable the sound signals to propagate into the audio environment 203. For instance if the audio environment comprises a room then sound signals caused by traffic or people on the street could propagate into the room and so be audible within the audio environment 203.

The electronic devices 201 can be configured so that the apparatus 101 within the electronic devices 201 can use signals detected by the transceivers 205 to analyse the audio environment 203.

Figure 3:
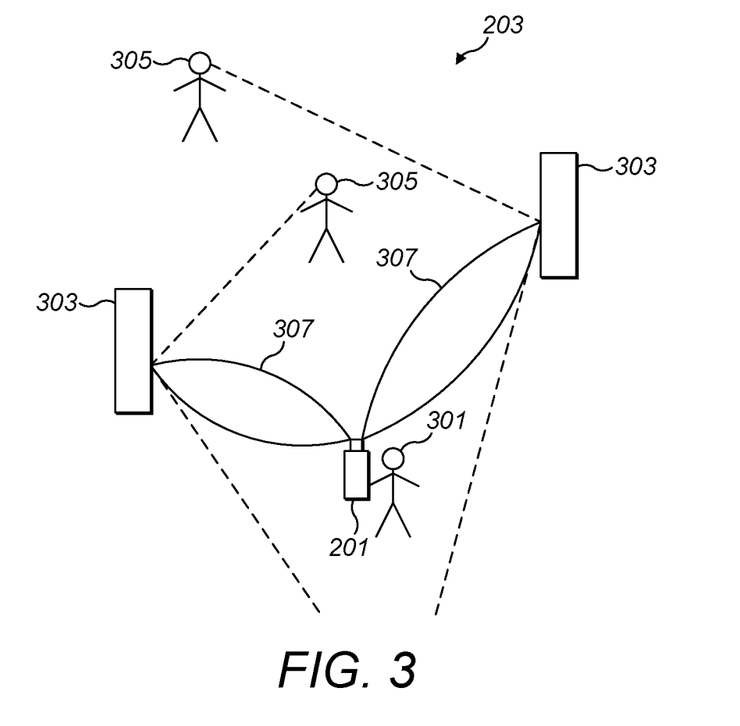
FIG. 3 shows an example audio environment.

FIG. 3 schematically shows an example audio environment 203. The audio environment 203 comprises an electronic device 201 being used by a user 301, a plurality of acoustic reporters 303, and a plurality of sound sources 305. The entities in FIG. 3 are not drawn to scale.

The electronic device 201 can be as shown above in FIG. 2. In the example shown in FIG. 3 the audio environment 203 only comprises one electronic device 201. It is to be appreciated that the audio environment 203 could comprise a plurality of electronic devices 201. For instance, each person within the audio environment 203 could have their own mobile phone and additional electronic devices 201 such as smart speakers, smart watches, or laptops could be included.

The electronic device 201 is configured to provide radiofrequency beams 307. The radiofrequency beams comprise directional transmissions from the antenna elements of the transceiver 205. The electronic device 201 can be configured to control the directions of the radio frequency beams 307.

In the example shown in FIG. 3 the audio environment 203 comprises two sound sources 305. It is to be appreciated that any number of sound sources 203 can be provided in other examples of the disclosure. Also in the example of FIG. 3 the sound sources 305 are located within the audio environment 203. In other examples the sound sources 305 can be external to the audio environment and the sound signals created by the sound sources 305 can propagate into the audio environment 203. For example, outdoor noises such as traffic can propagate into a building through a window.

The sound sources 305 can comprise any entities that generate sound signals. In the example of FIG. 3 the sound sources 305 can comprise people who could be talking or making other noises. The sound of the people talking can have a higher frequency as compared to background noises such as traffic. Other types of sound sources 305 could be present in other examples of the disclosure.

The acoustic reporters 303 can comprise any entities that provide a detectable response when a sound signal is incident on them. The acoustic reporters 303 can comprise a surface that reflects or scatters an incident sound signal and is also susceptible to reflection of the radio frequency beams provided by the electronic device 201. The acoustic reporters 303 could comprise items of furniture, metallic fixtures on the walls, curtain weights, electronic devices 201 or anything else that can be configured to report a sound signal.

The acoustic reporters 303 can vibrate or oscillate when the sound signal is incident on them. This response can be detected by the radiofrequency beams 307 provided by the transceiver 205 of the electronic device 201. This enables a sound signal to be reported by the acoustic reporter 303.

In examples of the disclosure the radiofrequency beams 307 provided by the transceiver 205 can comprise high frequency beams having a wavelength of approximately 10 mm or less. For instance, the radiofrequency beams 307 provided by the transceiver 205 could be 5G beams. The short wavelength of the radiofrequency beams 307 provided by the transceiver 205 enables high frequency oscillations of the acoustic reporters 303 to be detected and so can provide information about high frequency sound sources 305 such as people talking. The information could comprise the energy levels of respective frequency components of the sound source 305. In some examples this can enable the high frequency sound sources to be categorized as being a particular type of sound source 305. For instance, people talking has known and recognizable frequency spectra within the human-audible frequency range of around 8 Hz to 20 kHz. Components of speech falling within predetermined frequency ranges that can aid speech intelligibility for a user 301 can also be identified, such as around: 500 Hz, 1 kHz, 2 kHz, and 4 kHz. Any other suitable frequencies or frequency ranges may be set to identify other types of sound sources 305.

In the example shown in FIG. 3 the acoustic reporter 303 is provided in the line of sight of the electronic device 201. This enables the radiofrequency beams 307 to be transmitted directly towards the acoustic reporters 303. In other examples the acoustic reporters 303 need not be within the line of sight of the electronic device 201. This could provide for a more complex propagation path of the radiofrequency beams 307 between the acoustic reporters 303 and the electronic device 201.

In the example shown in FIG. 3 the objects within the audio environment 203 are shown as being either a sound source 305 or an acoustic reporter 303. It is to be appreciated that in some examples an object could be both a sound source 305 and an acoustic reporter 303. Also the electronic devices 201 could be sound sources 305 in addition to enabling monitoring of the audio environment 203.

FIG. 4 shows an example method that could be implemented using apparatus 101 and electronic devices 201 as shown above. The electronic devices 201 comprising the apparatus 101 can be located in audio environments as shown in FIG. 3 and described above.

The method comprises, at block 401, using a radiofrequency beam 307 having a wavelength below approximately 10 mm to interrogate one or more acoustic reporters 303 in an audio environment 203.

The radiofrequency beam 307 can be provided by the antenna elements of transceiver 205 of the electronic device 201. The electronic device 201 can be configured to sweep the radiofrequency beams 307 around the audio environment 203. The electronic device 201 can be configured to direct the radiofrequency beams 307 at different angles to enable different acoustic reporters 303 at different positions to be interrogated.

The acoustic reporters 303 cause the reflection or scattering of sound signals provided by the sound sources 305. The radiofrequency beams 307 that are directed towards the acoustic reporters 303 are reflected by the acoustic reporters 303. Due to the short wavelength of radiofrequency beam 307 any sound that is detected by the acoustic reporter 303 will affect the reflected radio frequency beam and enable the sound signal 305 to be reported to the electronic device 201 by the radio frequency beam 307 being reflected back to the electronic device 201. This can enable the radiofrequency beam 307 to detect high frequency audio signals reported by the acoustic reporters 303. The high frequency audio signals could be people talking or any other suitable high frequency signals.

The method comprises, at block 403, analysing one or more sound signals reported by the one or more acoustic reporters 303 to determine positions of one or more sound sources 305 providing the one or more sound signals.

The transceiver 205 of the electronic device 201 can be configured to receive the reflected radiofrequency beams and provide these to the apparatus 101 to enable signal processing. In some examples the apparatus 101 within the electronic device 201 that receives the reflected radiofrequency beams can be used to perform the signal processing. In other examples the electronic device 201 could receive the reflected radiofrequency beams and then provide information relating to the received reflected radiofrequency beams to another electronic device 201, the another electronic device 201 configured to perform the signal processing. For instance a plurality of electronic devices 201 can be configured to provide the radiofrequency beams 307 for interrogation of the acoustic reporters and a central electronic device 201 could be configured to collect the responses and analyse them. Such systems could have radio frequency beams 307 being reflected to a central electronic device or radio frequency beams being reflected back to the original electronic device and analysed before being transmitted to a central electronic device 201 for analysis or a combination of such features.

The signals received by the electronic devices 201 can be processed to enable a position of the one or more sound sources 305 to be determined. The position can be the location and the orientation of the sound source 305 within the audio environment. For instance, a plurality of reflected radiofrequency beams from a plurality of different acoustic reporters 303 can be detected. If the positions of the acoustic reporters 303 are known then the reflected radiofrequency beams can be processed to identify the sound signals that are detected by the acoustic reporters 303. The sound signals can be identified by comparing energy levels for different frequency bands of the sound signals. This gives an indication of the sound scene at the location of the acoustic reporter 303. The sound scenes that are available at the different positions of different acoustic reporters 303 can be analysed to determine the position of one or more sound sources 305 relative to the acoustic reporters 303.

The position of the acoustic reporters 303 can be determined using any suitable process. For example the direction of the radiofrequency beam 307 that is used to interrogate an acoustic reporter 303 gives an indication of the angular position of the acoustic reporter 303 relative to the electronic device 201 and the time taken for the reflected radiofrequency beam 307 to be detected gives an indication of the distance between the electronic device 201 and the acoustic reporter 303. In some examples a sweep of the radiofrequency beam 307 can be used to determine the position of the acoustic reporters 303 before they are interrogated. In some examples the sweep of the radiofrequency beam 307 can be performed at different points in time to enable changes in position of one or more of the acoustic reporters 303 to be identified.

In other examples the positions of the acoustic reporters 303 could be determined using other means. For instance an acoustic reporter 303 such as a wall fitting could be in a fixed position. Information relating to this position could be accessible by the electronic device 201.

At block 405 the method comprises using the positions of the one or more sound sources 305 to determine one or more sound propagation paths within the audio environment 203. In some examples the position of one or more acoustic reporters 303 is used, with the determined position of the sound sources 305, to determine the one or more sound propagation paths within the audio environment 203.

The sound propagation paths can be determined by identifying how the same sound signal is reported by different acoustic reporters 303 within the audio environment 203. The same sound signal can be identified by correlating the sound signals reported by the different acoustic reporters 303. The differences in the energy levels and directions of the sound signals reported by the different acoustic reporters 303 can be used to identify the same sound signals. The differences in the way that the same sound signals are reported by different acoustic reporters 303 gives information about the position of the sound sources relative to the acoustic reporters 303. This information, and the position of the acoustic reporters can be used to estimate the sound propagation paths.

The sound propagation paths define the trajectory that is taken by sound signals between the sound sources 305 and the electronic device 201. In some examples the sound propagation paths comprise at least one sound propagation path from a sound source 305 to a user within the audio environment 201. The user could be a user of the electronic device 201 or another user within the audio environment. The sound propagation paths can be direct paths or indirect paths. Indirect sound propagation paths can comprise reflection and scattering from entities such as acoustic reporters 303 within the audio environment 203. As the radiofrequency beam 307 that is used to interrogate the acoustic reporters 303 has a short wavelength this allows complex sound propagation paths to be monitored.

In some examples the indirect sound propagation paths could comprise the sound travelling through objects such as walls. For instance, a sound source 305 could be provided in a different room to the user 301 or the electronic device 201 but the sound signal could be loud enough so that the sound can propagate through the wall and still be audible to the user 301.

The sound propagation paths can be used for any suitable purpose. In some examples the sound propagation paths can be used, with information about the reported sound signals, to estimate one or more anti sound signals. The anti-sound signals could be used to provide noise cancellation within the audio environment 203. The anti-sound signals could be provided to the user of the electronic device 201. For example they could be provided to the user of the electronic device 201 so as to cancel the background noise for the user 301.

The anti-sound signals can be directional signals that take into account the directionality of the sound signals. This can enable different anti sound signals to be provided by different speakers within a surround sound system, or can enable different anti sound signals to be provided by different earpieces in a binaural sound system.

As the radiofrequency beam 307 that is used to interrogate the acoustic reporters 303 has a wavelength of below approximately 10 mm this enables high frequency sound to be detected. When the anti-sound signal is created this can therefore take the high frequency sounds into account. This can enable an anti-sound signal to be provided that cancels out high frequency sounds such as people talking. Therefore examples of the disclosure can provide a noise cancelling system that can cancel high frequency noises such as people talking.

In some examples the anti-sound signals can be provided to the user 301 of the electronic device 201. The user 301 can be assumed to be positioned close to the electronic device 201. In other examples the anti-sound signals can be provided to a different user. For instance, the anti-sound signals could be provided so that another person, such as a sleeping baby or young child is not disturbed by the sound signals. In such examples the position of the other users could be determined by the electronic device 201 or by any other suitable means.

In some examples the sound propagation paths can be used to enhance one or more sound signals to be provided to a user. For instance a user might want to be alerted to an event such as a doorbell ringing, a pan starting to boil, or other suitable event that creates a sound. In such cases the acoustic reporters 303 will report the sound signal when the event occurs so that interrogation of the acoustic reporters 303 can be used to detect when the event has occurred. In such examples the anti-sound signal can then be provided to reduce background noise but increase the relative volume of the detected sound signal so that the user 301 becomes aware of the event that has caused the sound signal.

In some examples the electronic devices 201 can be configured to enable information about the acoustic environment 203 to be provided to a user of the electronic device 201. For example a map or image could be displayed on a display indicating the positions of one or more of the sound sources 305 and/or one or more of the acoustic reporters 303. This information could be used by the user 301 to adapt the audio environment 203 or for any other suitable purpose. For example, if a user 301 is alerted to one or more acoustic reporters 303 that are causing reflection of the sound signals and creating unwanted noise for the user 301 the user 301 could reduce this effect by moving the acoustic reporters 303 or by covering them up. This could help the user to create a more secure audio environments 203. For example, it can help the user 301 to move or modify acoustic reporters 303 to ensure that their conversations cannot be heard by other people in the audio environment 203 or in a nearby audio environment. In other examples it could enable a user to create an environment 203 in which they could hear conversations from people located in a position that could make the conversation difficult to hear. For instance, if a group of friends are seated across several tables in a café or bar or other noisy environment it can be difficult to hear people talking if they are not seated next to each other. The examples of the disclosure could be configured to enhance the sound signals corresponding to the conversations and enable the users to hear each other.

In some examples the electronic devices 201 can be configured to detect one or more other electronic devices 201 within the audio environment 203. The electronic devices 201 can comprise apparatus 101 that enable these disclosed methods to be implemented. The electronic devices 201 can be configured to communicate with the one or more other detected electronic device 201. This can enable information to be shared between the different apparatus 101 in the different electronic devices 201.

The information that is shared can comprise information that relates to positions of one or more sound sources 305, positions of one or more acoustic reporters 303, one or more sound propagation paths within the audio environment 203 or any other suitable information.

In some examples the information that is shared could comprise a map of the audio environment 203 that is created by one apparatus 101 and shared with the other apparatus 101. The map could comprise an indication of the locations of the electronic devices 201 and the acoustic reporters 303 within the audio environment 203. In other examples the information that is shared could comprise information that can be used by one or more of the apparatus 101 to create a map of the audio environment 203. For instance a first apparatus 101 could determine a position of a subset of the sound sources 305 and could provide that information to another apparatus to enable the other apparatus to create the map of the audio environment 203.

In examples where there are a plurality of electronic devices 201 provided within the audio environment the apparatus 101 a first electronic device 201 can be configured to determine which of the available electronic devices 201 should be used to interrogate the acoustic reporters 303 within the audio environment 203. Any suitable criteria can be used to determine which of the electronic devices 201 is used to interrogate each of the acoustic reporters 303.

In some examples the electronic devices 201 that are closest to the acoustic reporters 303 can be used to interrogate the acoustic reporters 303.

In some examples the electronic device 201 that should be used to interrogate an acoustic reporter 303 can be determined based on the activity level of the apparatus 101 within the electronic devices 201. For example, the apparatus 101 with the lowest activity levels could be used for the interrogation as they have more resources available. The available resources could be power, processing capacity, signal bandwidth or any other suitable resource bandwidths.

In some examples the electronic devices 201 that should be used to interrogate an acoustic reporter 303 can be determined so as to reduce the number of apparatus 101 being used to interrogate the acoustic reporters 303. This can help to reduce the bandwidth of the electronic device(s) 201 that is/are used for interrogating the acoustic reporters.

In some examples the interrogating of one or more acoustic reporters 303 can be prioritised to reduce the bandwidth used for the interrogations or to optimise any other suitable parameter. For instance, in some examples sound signals having a higher frequency can be prioritised over sound signals having a lower frequency.

In some examples the radiofrequency beam 307 that is used to interrogate the acoustic reporters can comprise one or more data packets. This can enable information that needs to be transmitted to be included in the one or more data packets. As the signals containing the data packets are transmitted in the audio environment they are modulated by the acoustic reporters 303 that they are incident on. This modulation provides information about the locations of the acoustic reporters 303 in the audio environment 203. This enables the signals to be used for interrogation of the acoustic reporters 303 and also for transmitting information and so can reduce the bandwidth and energy requirements of the electronic device 201.

In some examples the method could be used to provide an alert for a user 301. For instance the radiofrequency beams 307 and acoustic reporters 303 could be configured to detect noises such as a window being broken or a door being opened. When this noise is detected, instead of providing an anti-sound signal an alert could be provided to the user of the electronic device 201. Similarly the electronic devices 201 could be configured to monitor the movements of a vulnerable person such as an elderly person. In such examples the electronic devices could be configured to detect the sound of a person falling over. In some examples the electronic devices 201 could be configured to provide an alert if no sound is detected for a predetermined time, for instance if there are no sounds caused by the vulnerable person moving around the audio environment 203. In such examples the electronic devices 201 could be configured to provide an alert to a user of a different electronic device 201, for example the alert could be provided to carer or relative who need not be within the audio environment 203.

FIG. 5 shows another example method that can be implemented using examples of the disclosure. The method can be implemented using apparatus 101 and electronic devices 201 as shown in FIGS. 1 and 2.

In this example the method is used to provide an anti-sound signal to a user for noise cancelling purposes. It is to be appreciated that the method could be adapted for other purposes.

The method comprises, at block 501, performing a sweep to determine the location of one or more acoustic reporters 303 within the audio environment 203. The sweep can be performed by directing the radiofrequency beam 307 of the electronic device 201 in different directions. The reflections from the different directions can provide an indication of the position of the acoustic reporters 303 relative to the electronic device(s) 201.

The sweep of the radiofrequency beams 307 can be performed by a plurality of electronic devices 201. The plurality of the electronic devices 201 can perform the sweep simultaneously. The plurality of electronic devices 201 can be configured so that different electronic devices 201 sweep different areas of the audio environment 203.

At block 503 the locations of any new acoustic reporters 303 that are detected in the sweep are recorded. The locations of the new acoustic reporters 303 can be recorded in a map or database, or any other suitable means. The recorded locations of the acoustic reporters 303 provides an array of virtual microphones where the acoustic reporters 303 act as virtual microphones by responding to incident sound signals.

At block 503 any changes in positions of other acoustic reporters 503 can also be recorded. For instance, if an acoustic reporter 303 has moved the new position could be recorded. In some examples other changes in the status of the acoustic reporters 303 could also be recorded, for instance a user could have opened or closed curtains that could have covered or uncovered an acoustic reporter 303 without changing the position of the acoustic reporter 303 itself.

Blocks 501 and 503 can be repeated as needed. In some examples blocks 501 and 503 can be repeated periodically so that the sweep for acoustic reporters 303 is performed at regular intervals. This can enable any changes in the acoustic reporters 303 to be detected. For instance, it can detect if an acoustic reporter 303 has moved, or if an object such as a person or a door could have moved relative to the acoustic reporter 303 or if a new acoustic reporter 303 has been added to the audio environment or any other suitable changes.

In some examples the sweep for acoustic reporters 303 can be performed in response to one or more trigger events. The trigger events could be a user input via the user interface 209, the detection of a change in the audio environment 203 or any other suitable trigger event.

At block 505 the acoustic reporters 303 are interrogated to enable sound signals to be reported by the one or more acoustic reporters 303. The acoustic reporters 303 are interrogated by directing a radiofrequency beam 307 towards the one or more acoustic reporters 303. The radiofrequency beam can be a high frequency beam having a wavelength below approximately 10 mm. The reflected high frequency beams comprise information of the sound signals detected by the acoustic reporters 303.

The interrogation of the acoustic reporters 303 can be performed at multiple time instances. The frequency with which the interrogation occurs can be determined by factors such as, the noisiness of the audio environment 203, the number of electronic devices 201 available to perform the interrogation or any other suitable factor. In some examples a user 301 of an electronic device could make an input via the user interface 209 to indicate a setting that they wish the electronic device 201 to operate on. The setting could allow the user 301 to indicate whether the audio environment 203 is a high noise environment or a low noise environment. The interrogation can occur more frequently in a high noise environment. In some examples the interrogation of the acoustic reporters can be used to determine the noisiness of the audio environment 203 and the proportion of high and low frequency noises within the audio environment 203. This could be used to determine the frequency at which the interrogation should be performed. In some examples, based on the interrogation of the acoustic reporters 303, one or more regions of the audio environment 203 may be determined to be noisier and/or have a greater proportion of high frequency noises than low frequency noises, as compared to one or more other regions of the audio environment 203. For example, a first region may be determined to be noisier than a second, different region based on a threshold level, e.g. set levels of noise, or a percentage threshold such as a 20% higher level of noise than the second region. The interrogation may then be performed more frequently for the one or more regions of the audio environment 203 determined to be noisier than one or more other regions of the audio environment 203. At block 507 the sound signals detected by the acoustic reporters 303 and reported by way of reflection of the radiofrequency beam 307 back to device 201 are analysed. This analysis can use sound signals reported by a plurality of different acoustic reporters 303 to determine the location of one or more sound sources 305 within or outside the audio environment 203. The location of the one or more sound sources 305 can be determined by comparing how different acoustic reporters 303 report the same sound signals.

In some examples the locations of the one or more sound sources 305 can be used to create a map of the audio environment 203. The map can comprise information indicating the relative positions of the sound sources 305, the acoustic reporters 303 and the electronic devices 201. In some examples the map can also comprise additional information such as the location of one or more users which could be different to the location of the electronic devices 201.

At block 509 sound signals are reported by the acoustic reporters 303 to the one or more electronic devices 201. The map that has been created at block 507 can be used to determine the positions of the sound sources 305 that create the sound signals. In some examples where the sound source 305 is located outside of the audio environment the position at which the sound signals enter the audio environment 203 could be determined. For instance, traffic noise or other outdoor noises could predominantly enter the audio environment through a window or other opening.

At block 511 the sound signals reported to the electronic devices 201 and the locations of the one or more acoustic reporters 303 are used to determine the sound propagation paths to the user 301. In this example the user 301 is the user of the electronic device 201. In other examples the user 301 could be a different user who is located within the audio environment 203.

At block 513 the sound propagation paths and the sound reported by the acoustic reporters 303 are used to calculate anti-sound that can be used to provide noise cancellation for the users in the audio environment 203. The anti-sound signal can be provided by the audio output 207 of the electronic device 201. In other examples another audio output device could be used to provide the anti-sound signal. In such examples the anti-sound signal would need to be adjusted to take into account the position of the audio output device relative to the user 301.

Figure 6:
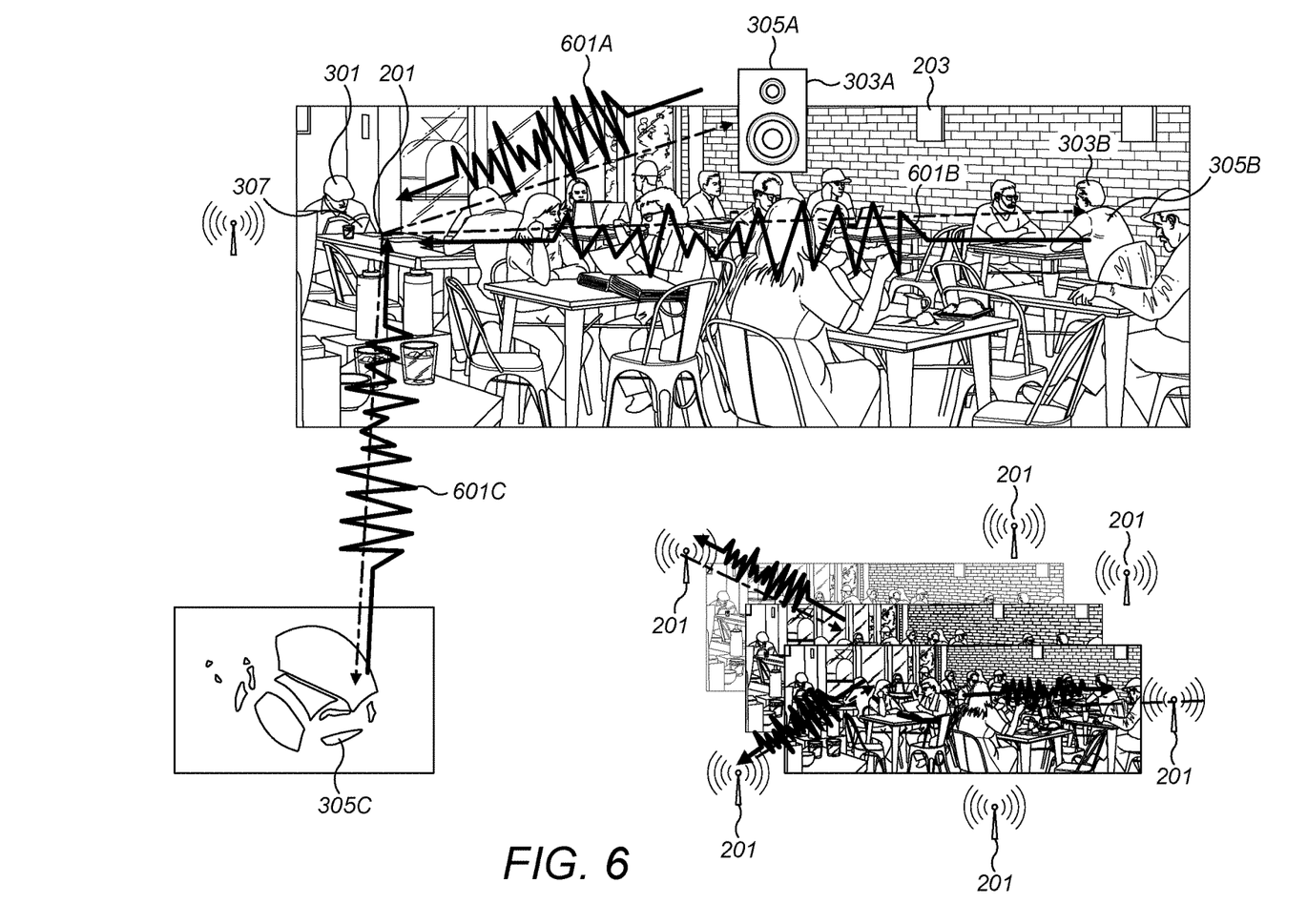
FIG. 6 shows another example audio environment.

FIG. 6 shows another example audio environment 203. In this example the audio environment 203 comprises a café in which a plurality of people are seated at tables throughout the audio environment 203.

A user 301 is sitting at a table with their electronic device 201. The electronic device 201 could be a mobile phone or a laptop or any other suitable type of electronic device 201. The user 301 wishes to focus on their reading material and so controls their electronic device 201 to provide them with an anti-sound signal for active noise cancellation.

The audio environment 203 comprises a loudspeaker that provides both a first sound source 305A and acoustic reporter 303A. The loudspeaker can be configured to provide a sound signal 601A, for instance the loudspeaker can be playing music. The loudspeaker can also comprise one or more surfaces that vibrate if a sound signal is incident on it and therefore also acts as an acoustic reporter 303.

The audio environment 203 comprises a person talking loudly that provides both a second sound source 305B and acoustic reporter 303B. The person talking loudly provides another sound signal 601B. The action of talking causes a vibration of the throat of the person. This vibration can be detected by a radiofrequency beam and so the person also provides an acoustic reporter 303B.

The electronic device 201 uses radiofrequency beams 307 with a wavelength below approximately 10 mm to determine the location of the acoustic reporters 303A, 303B and any sound sources 305 within the audio environment. The acoustic reporters 303A, 303B can then be interrogated to determine the sound signals provided by the sound sources 305A, 305B and enable the anti-sound signal to be estimated.

Sounds signals from sound sources 305C that are not located within the audio environment 203 can also propagate within the audio environment 203. For instance a sound source 305C could be a plate being dropped which creates a very loud and sudden sound signal that could propagate through a wall or door or other barrier. In examples, the interrogation of the acoustic reporters 303 can be used to identify the probable positions of noisy sound sources 305. For instance in this example it could identify the location of the kitchen where plates could be dropped and pans could be clattered. Once the electronic device 201 knows the probable positions of noise sound sources 305 the electronic device can configured the antenna elements to direct the radio frequency beam 307 towards that location. This can enable monitoring for the noisy sound sources so that they can be accounted for in the anti-sound signal.

In the example shown in FIG. 6 a plurality of other electronic devices 201 can be provided in other audio environments. For instance different electronic devices 201 could be provided in different rooms within the same building. The electronic devices 201 could be configured to provide information relating to the audio environments 203 and the positions of sound sources within the audio environments. This information could be shared using a 5G communication network or any other suitable type of communication network. The information can be used by the electronic devices 201 to determine more complex propagation paths for sound signals within the audio environment 203 in which the user is located. For example it can provide an indication of sound sources 305 that could create sound signals that propagate through walls into the audio environment of the user 301.

Therefore the examples of the disclosure provide apparatus 101, methods and computer programs 109 that enable analysis of audio environments. The analysis can be used to provide noise cancellation or for any other suitable purposes.

The use of the radiofrequency beam 307 to interrogate the acoustic reporters 303 can enable the system (apparatus 101, methods and computer programs 109) to be used to modify high frequency sound signals such as people talking. The radio frequency beam 307 propagates through the audio environment 203 much faster than sound signals and so this can provide for a faster provision of anti-sound signals or other enhancements to the sound signals. This can provide for a better adaptation of the high frequency sound signals than can be achieved with existing noise cancellation systems which require the received sound signals to be analysed. Such systems cannot adapt quickly enough to the high frequency sound signals and so cannot provide sufficient anti-sound signals for high frequency components.

The systems, apparatus, methods and computer programs can use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one memory including computer program code,
   the at least one memory and the computer program code configured to, with the at least one processor, cause the apparatus at least to:
   use a radiofrequency beam having a wavelength below approximately 10 mm to interrogate one or more acoustic reporters in an audio environment;
   analyze one or more sound signals reported by the one or more acoustic reporters to determine positions of one or more sound sources providing the one or more sound signals;
   use the positions of the one or more sound sources to determine one or more sound propagation paths within the audio environment; and
   prioritize interrogating the one or more acoustic reporters based on the frequency of the sound signals reported by the one or more acoustic reporters such that higher frequency signals have a higher priority than lower frequency signals.

2. An apparatus as claimed in claim 1 wherein the at least one memory and the computer program code are configured to, with the at least one processor, further cause the apparatus to:
   perform a sweep of the radio frequency beam to determine the positions of one or more acoustic reporters.

3. An apparatus as claimed in claim 1 wherein the positions of one or more acoustic reporters are used, with the positions of the one or more sound sources, to determine the one or more sound propagation paths within the audio environment.

4. An apparatus as claimed in claim 1 wherein the one or more sound propagation paths comprise at least one sound propagation path from a sound source to a user within the audio environment and at least one sound propagation path comprises an indirect sound propagation path.

5. An apparatus as claimed in claim 1 wherein the at least one memory and the computer program code are configured to, with the at least one processor, further cause the apparatus to:
   use the one or more sound propagation paths and information about the one or more reported sound signals to estimate one or more anti-sound signals to be provided to a user within the audio environment.

6. An apparatus as claimed in claim 1 wherein the at least one memory and the computer program code are configured to, with the at least one processor, further cause the apparatus to:
   use the one or more sound propagation paths to enhance one or more sound signals to be provided to a user.

7. An apparatus as claimed in claim 1 wherein the one or more sound propagation paths are determined by identifying how the same sound signal is reported by different acoustic reporters within the audio environment.

8. An apparatus as claimed in claim 1 wherein the at least one memory and the computer program code are configured to, with the at least one processor, further cause the apparatus to:
   use the determined position of one or more sound sources to configure the apparatus to monitor for sounds in the determined position.

9. An apparatus as claimed in claim 1 wherein the at least one memory and the computer program code are configured to, with the at least one processor, further cause the apparatus to:
   detect one or more other apparatus within the audio environment and share information with the one or more other apparatus wherein the shared information relates to one or more of: positions of one or more sound sources, positions of one or more acoustic reporters, one or more sound propagation paths within the audio environment.

10. An apparatus comprising:
at least one processor; and
at least one memory including computer program code,
the at least one memory and the computer program code configured to, with the at least one processor, cause the apparatus at least to:
use a radiofrequency beam having a wavelength below approximately 10 mm to interrogate one or more acoustic reporters in an audio environment;
analyze one or more sound signals reported by the one or more acoustic reporters to determine positions of one or more sound sources providing the one or more sound signals;
use the positions of the one or more sound sources to determine one or more sound propagation paths within the audio environment;
detect one or more other apparatus within the audio environment and share information with the one or more other apparatus wherein the shared information relates to one or more of: positions of one or more sound sources, positions of one or more acoustic reporters, one or more sound propagation paths within the audio environment; and
determine which apparatus within the audio environment should interrogate one or more of the acoustic reporters within the audio environment.

11. An apparatus as claimed in claim 10 wherein the apparatus that should interrogate one or more acoustic reporters within the audio environment is determined based on one or more of: the position of the apparatus relative to one or more acoustic reporters, the activity level of the apparatus, reducing the number of apparatus being used to interrogate one or more acoustic reporters.

12. An apparatus as claimed in claim 1 wherein the radiofrequency beam used to interrogate the acoustic reporters comprises 5G signals.

13. A method comprising:
using a radiofrequency beam having a wavelength below approximately 10 mm to interrogate one or more acoustic reporters in an audio environment;
analyzing one or more sound signals reported by the one or more acoustic reporters to determine positions of one or more sound sources providing the one or more sound signals;
using the positions of the one or more sound sources to determine one or more sound propagation paths within the audio environment; and
prioritizing interrogating the one or more acoustic reporters based on the frequency of the sound signals reported by the one or more acoustic reporters such that higher frequency signals have a higher priority than lower frequency signals.

14. The method as claimed in claim 13 further comprising:
performing a sweep of the radio frequency beam to determine the positions of one or more acoustic reporters.

15. The method as claimed in claim 13 wherein the positions of one or more acoustic reporters is used, with the positions of the one or more sound sources, to determine the one or more sound propagation paths within the audio environment.

16. The method as claimed in claim 13 further comprising:
using the one or more sound propagation paths and information about the one or more reported sound signals to estimate one or more anti-sound signals to be provided to a user within the audio environment.

17. A non-transitory computer readable medium comprising program instructions stored thereon for performing at least the following:
using a radiofrequency beam having a wavelength below approximately 10 mm to interrogate one or more acoustic reporters in an audio environment;
analyzing one or more sound signals reported by the one or more acoustic reporters to determine positions of one or more sound sources providing the one or more sound signals;
using the positions of the one or more sound sources to determine one or more sound propagation paths within the audio environment; and
prioritizing interrogating the one or more acoustic reporters based on the frequency of the sound signals reported by the one or more acoustic reporters such that higher frequency signals have a higher priority than lower frequency signals.

18. The non-transitory computer readable medium of claim 17 wherein the program instructions are further configured to cause: performing a sweep of the radio frequency beam to determine the positions of one or more acoustic reporters.

19. The non-transitory computer readable medium of claim 17 wherein the positions of one or more acoustic reporters is used, with the positions of the one or more sound sources, to determine the one or more sound propagation paths within the audio environment.

* * * * *